United States Patent [19]

Akao

[11] Patent Number: 4,701,359
[45] Date of Patent: Oct. 20, 1987

[54] PACKAGING MATERIAL FOR PHOTOSENSITIVE MATERIALS

[75] Inventor: Mutsuo Akao, Kanagawa, Japan

[73] Assignee: Fuji Photo Film Co., Ltd., Kanagawa, Japan

[21] Appl. No.: 821,414

[22] Filed: Jan. 22, 1986

[30] Foreign Application Priority Data

Jan. 28, 1985 [JP] Japan .................. 60-12663
Feb. 19, 1985 [JP] Japan .................. 60-29416

[51] Int. Cl.$^4$ .............................................. B27N 5/02
[52] U.S. Cl. .................................... 428/35; 428/220; 428/500; 428/516
[58] Field of Search ................. 428/220, 516, 500, 35

[56] References Cited

U.S. PATENT DOCUMENTS

| | | | |
|---|---|---|---|
| 4,430,289 | 2/1984 | McKinney et al. | 264/564 |
| 4,452,846 | 6/1984 | Akao | 428/222 |
| 4,513,050 | 4/1985 | Akao | 428/910 |
| 4,565,733 | 1/1986 | Akao | 428/910 |

*Primary Examiner*—Edith Buffalow
*Attorney, Agent, or Firm*—Burgess, Ryan & Wayne

[57] ABSTRACT

A packaging material for photosensitive materials for photographic purpose being light-shielding and having the following polyethylene polymer layer;

(a) containing 40 to 99% by weight of a low-pressure linear low-density polyethylene (L-LDPE) produced by copolymerization of ethylene and heptene-1 or octene-1 by a liquid phase method, the density of said polyethylene is in the range from 0.870 to 0.925 g/cm$^3$, and the melt index of the above polyethylene is in the range from 1.2 to 10 g/10 minutes.

(b) having a thickness of thicker than 20 μm, (c) being formed by inflation process, and (d) having a tear strength in longitudinal direction/a tear strength in lateral direction ratio of more than 0.6.

The packaging material of the invention is superior in the small difference in tear strength between longitudinal direction and lateral direction, in physical strength, in heat sealing properties and in light-shielding property. As a result, it can be made thinner than the conventional packaging material, and its cost is lowered. By blending a fatty acid amide lubricant, packaging aptitude is further improved, and blocking problems can be solved.

4 Claims, 22 Drawing Figures

PACKAGING MATERIAL FOR PHOTOSENSITIVE MATERIALS

BACKGROUND OF THE INVENTION

1. Field of the Invention

This invention relates to a packaging material for photosensitive materials for photographic purpose.

2. Description of Prior Arts

Various types of packaging materials for photosensitive materials for photographic purpose (hereafter simply referred to as "photosensitive materials") have been put to practical use, and various properties are required according to their uses.

Figure 21:
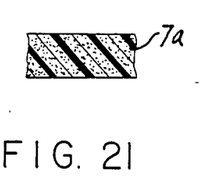
FIG. 21 is a sectional view of a conventional packaging material consisting of a single LDPE film layer 7a containing a light-shielding material.
Figure 22:
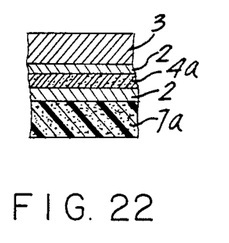
FIG. 22 is also a sectional view of a conventional packaging material consisting of a light-shielding LDPE film layer 7a, a metal foil 4a laminated thereon through an adhesive layer 2, and a flexible sheet layer 3 further laminated through an adhesive layer 2.

As a packaging material for photosensitive materials, it is necessary to have various properties such as light-shielding, gas barrier, moisture proofing, physical strength such as breaking strength, tear strength, impact puncture strength, Gelbo test strength and wear resistance, heat sealing properties such as heat seal strength, hot tack properties (hot-seal ability), and seal ability of contraries antistatic properties, flatness, slipping character and the like. Generally, it is difficult to satisfy these properties by a single material, and a single layer film of a high-pressure low-density polyethylene (LDPE) kneaded with carbon black or a pigment as shown in FIG. 21 or a laminated film composed of LDPE and a flexible sheet such as paper, aluminum foil or cellophane, etc. has been employed. An example of the conventional laminated film is shown in FIG. 22. This film is composed of a light-shielding LDPE film layer 7a, a light-shielding metal foil layer 4a laminated to it through an adhesive layer 2, and a flexible sheet layer 3 laminated thereupon through an adhesive layer 2.

On the other hand, the present inventor has already disclosed a laminated film for packaging photosensitive materials having improved physical strength by combining two uniaxially stretched films (U.S. Pat. No. 4,331,725). With respect to the packaging material containing a low-pressure linear low-density polyethylene (L-LDPE), a packaging material comprising at least one light-shielding film layer of polyethylene polymer of which more than 50 wt.% is L-LDPE and containing more than 1 wt.% of a light-shielding material has been disclosed (U.S. Pat. No. 4,452,846). A packaging material has been developed comprising a metallized film layer and two polyethylene polymer layers both of which contain more than 50 wt.% of L-LDPE, at least one of which layers contains a light-shielding material and which are laminated on both sides of the metallized film layer (U.S. Ser. No. 769,573). Both polyethylene polymer layers have particular relationships in strength and in the difference in thickness of the layers.

Physical properties of the conventional laminated films are not satisfactory, and during packaging, the films are sometimes torn or punctured or the heat of the films sometimes separated. In addition, when a large amount of a light-shielding material such as carbon black is added, physical strength of the film is lowered. When, the amount was set at about 3%, thickness of the film was more than 70 μm. As the result, the film was stiff, and working efficiency of the packaging process was adversely affected. Cost of the packaging was also expensive.

In the case of the laminated film disclosed in the specification of U.S. Pat. No. 4,331,725, since two layers of uniaxially stretched film are necessary, the laminated film is thick and expensive as a packaging material, though physical properties such as tear strength are improved.

The packaging material disclosed in the specification of U.S. Pat. No. 4,452,846 has also various problems in the formation of film, in the occurrence of blocking between films, in bad affect upon photosensitive materials such as fogging and increase or decrease of photosensitivity, in insufficient slipping character between films, in insufficient slipping character against photosensitive materials, in the occurrence of blocking against photosensitive materials, and in insufficient packaging character against photosensitive materials.

SUMMARY OF THE INVENTION

It is an object of the invention to provide a packaging material for photosensitive materials which is superior in physical properties and heat sealing properties and which does not affect photosensitive materials.

It is another object of the invention to provide a packaging material for photosensitive materials which is superior in working efficiency of the packaging process, in the formation of film and in slipping character of film.

It is a further object of the invention to provide a packaging material for photosensitive materials which is inexpensive and able to be put to practical use.

The present invention provides a light-shielding packaging material for photosensitive materials for photographic purpose which is characterized by having a particular polyethylene polymer layer.

Figure 1:
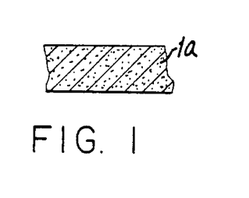
FIGS. 1 to 20 are sectional views of preferred embodiments of the invention.

The packaging material of FIG. 1 is the most fundamental packaging material consisting of a single layer of L-LDPE film 1a containing a light-shielding material and formed by inflation molding.

Figure 2:
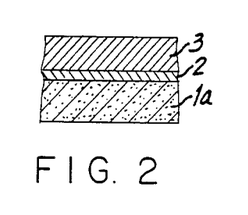

The packaging material of FIG. 2 consists of a light-shielding L-LDPE layer 1a and a flexible sheet layer 3 laminated thereupon through an adhesive layer 2.

Figure 3:
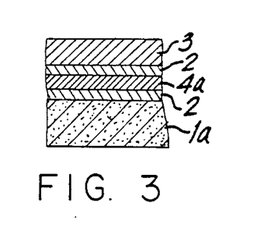

The packaging material of FIG. 3 is further laminated with a light-shielding layer such as metal foil 4a between the layers 1a and 3 of FIG. 2 through adhesive layers 2, 2.

Figures 4, 5, 6:
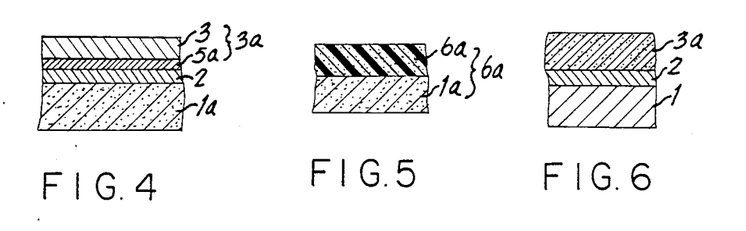

The packaging material of FIG. 4 consists of a light-shielding L-LDPE layer 1a and a metallized flexible sheet layer 3a (aluminum-metallized film and paper are representative examples.) laminated thereon through an adhesive layer 2. The metallized layer 3a consists of a flexible sheet 3 and a metal membrane 5a to add light-shielding property.

The packaging material of FIG. 5 is a coextruded film of a light-shielding L-LDPE film layer 1a and a thermoplastic resin layer 6a containing a light-shielding material.

The packaging material of FIG. 6 consists of a L-LDPE film layer 1 and a flexible sheet layer 3a containing a light-shielding material laminated thereon through an adhesive layer 2.

Figure 7:
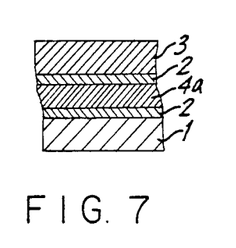

The packaging material of FIG. 7 consists of a a L-LDPE film layer 1, a metal foil layer 4a laminated thereon through an adhesive layer 2, and a flexible sheet layer 3 further laminated through an adhesive layer 2. No light-shielding material is contained in any layer, and the light-shielding property is secured by the metal foil layer 4a.

Figure 8:
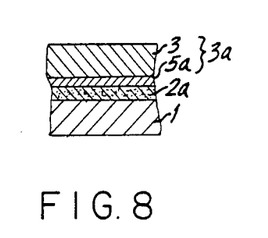

The packaging material of FIG. 8 consists of a L-LDPE film layer 1 and a metallized flexible sheet layer 3a laminated thereon through an adhesive layer 2a containing a light-shielding material.

Figure 9:
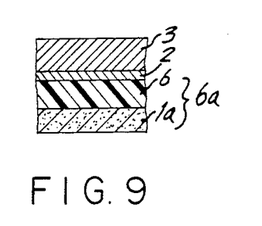

The packaging material of FIG. 9 consists of a coextruded light-shielding film layer 6a consisting of a light-shielding L-LDPE film layer 1a and a thermoplastic resin layer 6, and a flexible sheet layer 3 laminated on the above thermoplastic resin layer 6 through an adhesive layer 2.

Figure 10:
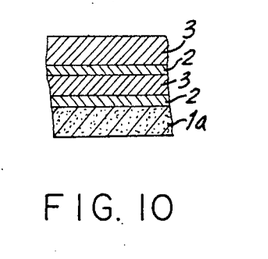

The packaging material of FIG. 10 consists of a light-shielding L-LDPE film layer 1a, and two flexible sheet layers 3,3 each of which is laminated through an adhesive layer 2.

Figure 11:
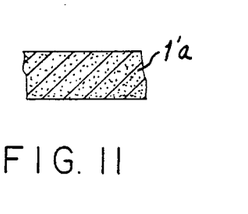

The packaging material of FIG. 11 is also a fundamental packaging material consisting single layer of L-LDPE film 1'a containing a light-shielding material and a lubricant and is formed by inflation molding.

Figure 12:
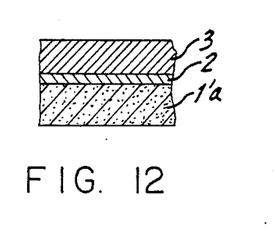

The packaging material of FIG. 12 consists of a light-shielding L-LDPE layer containing a lubricant 1'a and a flexible sheet layer 3 laminated thereupon through an adhesive layer 2.

Figure 13:
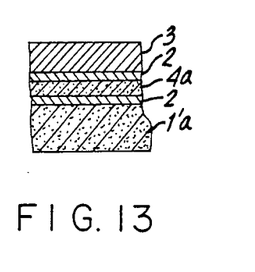

The packaging material of FIG. 13 is further laminated at light-shielding layer such as metal foil 4a between the layers 1'a and 3 of FIG. 12 through adhesive layers 2, 2.

Figure 14:
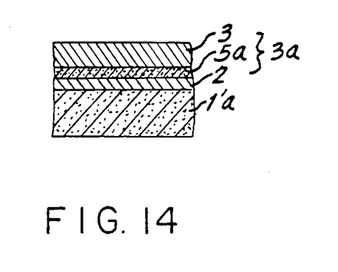

The packaging material of FIG. 14 consists of a light-shielding L-LDPE layer containing a lubricant 1'a and a metallized flexible sheet layer 3a (aluminum-metallized film and paper are representative examples.) laminated thereon through an adhesive layer 2. The metallized layer 3a consists of a flexible sheet 3 and a metal membrane 5a to add the light-shielding property.

Figure 15:
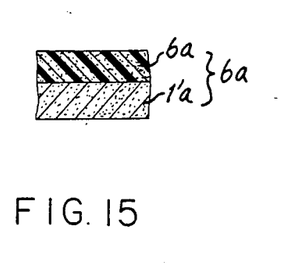

The packaging material of FIG. 15 is a coextruded film of a light-shielding L-LDPE film layer containing a lubricant 1'a and a thermoplastic resin layer 6a containing a light-shielding material.

Figure 16:
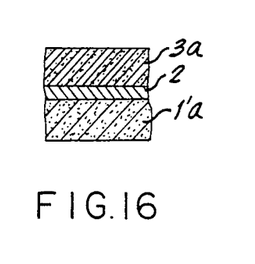

The packaging material of FIG. 16 consists of a light-shielding L-LDPE film layer containing a lubricant 1'a and a flexible sheet layer 3a containing a light-shielding material laminated thereon through an adhesive layer 2.

Figure 17:
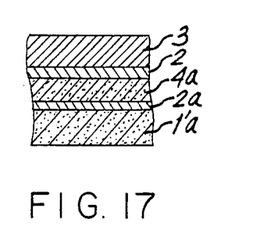

The packaging material of FIG. 17 consists of a light-shielding L-LDPE film layer containing a lubricant 1'a, a metal foil layer 4a laminted thereon through an adhesive layer containing a light-shielding material 2a, and a flexible sheet layer 3 further laminated through an adhesive layer 2. Antistatic property and light-shielding property are sufficiently secured by the two layers containing a light-shielding material and a metal foil layer.

Figure 18:
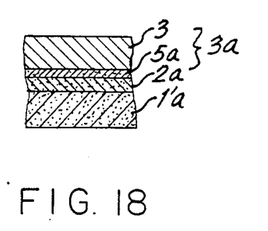

The packaging material of FIG. 18 consists of a light-shielding L-LDPE film layer containing a lubricant 1'a and a metallized flexible sheet layer 3a laminated thereon through an adhesive layer 2a containing a light-shielding material.

Figure 19:
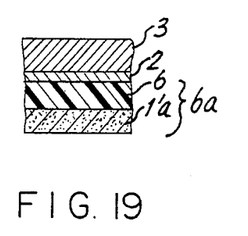

The packaging material of FIG. 19 consists of a coextruded light-shielding film layer 6a consisting of a light-shielding L-LDPE film layer containiing a lubricant 1'a and a thermoplastic resin layer 6, and a flexible sheet layer 3 laminated on the above thermoplastic resin layer 6 through an adhesive layer 2.

Figure 20:
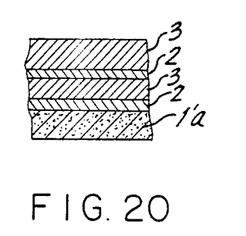

The packaging material of FIG. 20 consists of a light-shielding L-LDPE film layer containing a lubricant 1'a and two flexible sheet layers 3 3 each of which is laminated through an adhesive layer 2.

The layer contains L-LDPE produced by copolymerization of ethylene and heptene-1 or octene-1 by a liquid phase method. The structure of this L-LDPE is a linear straight-chain having short branches. Suitable ethylene content of the L-LDPE is 90 to 99.5 mol.% and according the content of heptene-1 or octene-1 is 0.5 to 10 mol.%. Octene-1 is more preferred than heptene-1. The preferred density of the L-LDPE is in the range of 0.870 to 0.925 g/cm$^3$ (JIS K 6760), and the preferred melt index (MI) is in the range of 1.2 to 10 g/10 minutes (JIS K 6760). Examples of such a L-LDPE include "DOWLEX" (trade name, Dow Chemical Co., Ltd.) and "STAMILEX" (trade name, DSM).

The L-LDPE content of the polyethylene polymer layer is more than 40 wt.%, preferably more than 50 wt.%, and further preferably more than 60 wt.% in terms of the improvement of physical strength. Whereas, in points of processing characteristics and balance between the tear strength in longitudinal direction and the tear strength in lateral direction, the content of the L-LDPE is preferably as little as possible. By blending another polyethylene polymer such as LDPE or a light-shielding material described later, processing characteristics and physical properties are improved. Particularly, tear strength, heat seal strength and Gelbo test strength are remarkably improved. The upper limit of the L-LDPE content is 99 wt.%, and the upper limits of the preferable ranges are determined by considering the above conditions. These upper limits are influenced by the addition of a light-shielding material.

As the resin to be blended with L-LDPE, LDPE is preferably employed. Other polyethylene polymers, such as ethylene-vinyl acetate copolymer (EVA), ethylene-ethylacrylate (EEA), ethylene-methacrylate (EMA), polyisobutylene, ethylene-acrylic acid copolymer (EAA), etc. can partially be added to the extent that its fundamental characteristics are not changed.

L-LDPE resin film is superior to LDPE resin film in strength, but it is inferior in the difficulty of processing, the occurrence of blocking between films and its poor slipping character. Accordingly, it was considered that this film was not suitable for packaging. However, the present inventor has examined the influence of carbon black upon L-LDPE resin, and he has found that physical strength of the L-LDPE resin greatly increases by blending carbon black contrary to the case of LDPE resin. That is, the strength of LDPE resin is essentially weaker than L-LDPE resin, and it is remarkably lowered by adding carbon black.

The effect of carbon black clearly appears at 1 wt.%, and remarkably appears at more than 3 wt.%. While, lumps increase with increasing the amount of carbon black, when its content exceeds 30 wt.%, the lumps remarkably increase and pinholes also form. On the other hand, carbon black is effective as a light-shielding material. In this case, light-shielding effect appears at 0.3 wt.%, clearly appears at 1 wt.%, and remarkably appears at more than 3 wt.%. As the packaging material for photosensitive materials, moistureproofness, flatness, strength of film surface, heat sealability and contamination of a photosensitive article or material are also problems. Accordingly, when these problems are also taken into consideration, suitable content of carbon black is in the range of 0.1 to 15 wt.%, and the range of 3 to 7 wt.% is particularly preferable.

Carbon blacks are divided into gas black, oil furnace black, anthracene black, acetylene black, lamp black, vegetable black and animal black according to their origin. Among these, oil furnace carbon black is preferred in terms of light-shielding character, cost and improvement of properties. On the other hand, since acetylene black and Ketschen carbon black have antistatic character, they are also preferred, though they are expensive. They may be blended with the oil furnace black in order to improve its character. Since Ketschen carbon black sometimes causes fogging of photosensitive materials, its selection or a countermeasure in a photosensitive emulsion is necessary. Suitable pH of carbon black is at 5 to 9, particularly at 6 to 8, and suitable mean particle size is 10 to 50 mμ. Particularly, the oil furnace carbon black or the acetylene black having pH 6 to 9 and mean particle size of 15 to 30 mμ are preferred. By using the carbon black of such pH and particle size, a packaging material having the following merits is obtained. That is, the occurrence of fogging is rare, increase or decrease of photosensitivity scarcely happens, light-shielding ability is great, and the lumps of carbon black and pinholes such as fish eyes hardly occur.

Carbon black is preferably blended into the inner face layer which contacts a photosensitive article or material to be packaged. By this location, the carbon black effectively shields light, it prevents the occurrence of blocking, it gives a slipping character, and it exhibits antistatic properties.

When the polyethylene polymer layer is located as the inner face layer, a fatty acid amide lubricant is preferably added in order to improve slipping character and blocking problems. A carbon number of the fatty acid amide is 10 to 50, preferably 15 to 35, and it includes an alkyhlene bis fatty acid amide. Examples of such a fatty acid amide are oleic acid amide, erucic acid amide, stearic acid amide, palmitic acid amide, methylenebis-stearic acid amide and ethylenebisstearic acid amide.

Examples of commercial lubricants suitable for the present invention include;

(Fatty acid amide)

"DIAMID G-200", "DIAMID O-200", "AMIDE AP-1", "DIAMID-KN", "DIAMID-200" and "DIAMID-H" (Nippon Kasei Chemical Co., Ltd.)
"NEWTRON" (Nippon Fine Chemical Co., Ltd.)
"AMIDE-S", "AMIDE-T", "AMIDE-P", "AMIDE-ON" (Nitto Kagaku K.K.)
"ALFLOW E-10", "ALFLOW P-10", "ALFLOW S-10" (Nippon Oil and Fats Co., Ltd.)
"AMIDE-HT", "AMIDE-O", "ARMOSLIP-CP POWDER", "AMIDE-C" (Lion Akzo Co., Ltd.)
"LUBROLL-EA" (ICI)

(Bis fatty acid amide)

"BISAMIDE", "DIAMID-200 BIS", "SLIPAX-KN" (Nippon Kasei Chemical Co., Ltd.)
"BISAMIDE" (Nitto Kagaku K.K.)
"ARMOWAX-EBS" (Lion Akzo Co., Ltd.)
"HOECHST WAX-C" (Hoeschst Japan)
"CHEMETRO WAX-100" (Nissan Ferro Chemical Co., Ltd.)

Chemical formulas of some examples are shown below;

Stearic acid amide lubricant

"ALFLOW S-10" (Nippon Oil and Fats Co., Ltd.)
Oleic acid amide lubricant

"ALFLOW E-10" (Nippon Oil and Fats Co., Ltd.)
Erucic acid amide lubricant

"ALFLOW P-10" (Nippon Oil and Fats Co., Ltd.)

The fatty acid amide lubricant may be used together with a higher alcohol lubricant, a fatty acid ester lubricant or the like.

A suitable amount of the fatty acid amide lubricant is 0.03 to 1 wt.%, and the range of 0.05 to 0.5 wt.% is particularly suitable. When the amount is less than 0.03 wt.%, viscosity and temperature of L-LDPE resin is raised by the frictional heat between L-LDPE resins at its moulding, and decomposition and color change of the resin occur. Moreover, the slipping characters between L-LDPE films, between L-LDPE film and a photosensitive article or material to be packaged and between L-LDPE film and a packaging machine become insufficient. On the other hand, when the amount is beyond 1 wt.%, gelation of L-LDPE becomes insufficient, and the raw materials are not uniformly kneaded. Accordingly, the L-LDPE film formed partially contains unmelted parts and parts having different viscosities, and its physical strength is weak. In addition, the surface of the L-LDPE film becomes sticky. As a result, not only dust attaches on the surface, but bleed out occurs and causes trouble in of development of the photosensitive films.

The fatty acid amide lubricant suitably controls gelation of L-LDPE, and solves the friction problem between L-LDPE film and processing machines and the photosensitive material to be packaged. Moreover, it raises stabilization effect by a stabilizer, and it raise productivity by the improvement of processing character of L-LDPE film. These results are obtained by the cooperative action of carbon black, and various problems, particularly bad influence against the photosensitive material, various inferior properties of L-LDPE film, poor heat sealing properties and bleed out cannot be solved by the lubricant alone.

The blending process of carbon black and a fatty acid lubricant with polyethylene polymer resin is not limited. However, the following masterbatch method is preferred, since it is inexpensive and since the amounts of carbon black and the lubricant are easily controlled.

First, a masterbatch of LDPE is prepared by blending more than 2%, usually more than 10%, of carbon black with LDPE. Then, L-LDPE is mixed with this masterbatch so that carbon black content becomes a prescribed value. Instead of LDPE, other polyolefin resins such as EEA and EVA or other thermoplastic resins capable of mixing with L-LDPE may also be employed. In this masterbatch method, mixing and dispersing of carbon black is easier than the case of blending carbon black directly with L-LDPE. As a result, fish eye problem is improved and manufacturing cost is lowered. In addition, though the polyethylene polymer layer produced by this method always contain LDPE, processing character of the mixed polymer of L-LDPE and LDPE is superior to that of L-LDPE alone. The resin for the masterbatch is not limited to LDPE. As this resin, a polyolefin resin which has a MI higher than L-LDPE is preferred because of homogeneous blending. L-LDPE may also be employed as the resin for masterbatch in order to save cost.

In the case of the fatty acid amide lubricant, it may be blended by the masterbatch method according to the above carbon black case. The compound coloring method wherein the lubricant is homogeneously mixed in the final concentration may also be employed. As the resin for masterbatch, a thermoplastic resin having a melt index higher than L-LDPE is preferably employed in order to mix homogeneously.

The polyethylene polymer film is molded, for example, by an inflation process. Melt tension and fluidity of L-LDPE are large problems in molding, and the energy necessary to produce film is larger than that of a conventional polyethylene. Modification or exchange of inflation molding machine is sometimes required. For that purpose, a modification of screw structure has been proposed (Japanese Patent Application Kokai No. 55-117638). However, according to this masterbatch method, such modification is not necessary in the case of resin containing carbon black and more than 5% of LDPE, and T die and inflation molding machine can be used as it is.

Blow-up ratio of the inflation process is preferably 1.1 to 2.5. Thickness of the L-LDPE film is thicker than 20 $\mu$m, preferably 30 to 150 $\mu$m, more preferably 40 to 100 $\mu$m. When the polyethylene polymer film is employed as a packaging material as a single layer film, its thickness is thicker than 30 $\mu$m, preferably thicker than 45 $\mu$m in order to provide satisfactory moistureproofing, light-shielding and heat sealing strength.

Since the packaging material of the invention is employed for packaging a photosensitive material, it should be light-shielding. In order to secure light-shielding, 0.1 to 30 wt.% of a light-shielding material may be added to one or more layers such as a flexible sheet layer, an adhesive layer, etc. Alternatively, a light-shielding film such as a colored paper, a metal foil such as aluminum foil or a thin steel film coated with zinc having a thickness of 5 to 50 $\mu$m, a paper having a metallized layer of 100 to 1200 Å such as an aluminum-metallized paper, or a metallized film such as aluminum-metallized film may be laminated to the L-LDPE film. The light-shielding property may be added by printing.

When the light-shielding property is secured by blending a light-shielding material, a suitable content is 0.5 to 36 g per m$^2$ of whole laminated layers. In the case of stretched film, a suitable content is 0.1 to 7 wt.%, and when the content is beyond 12 wt.%, fish eye problem and lowering of physical strength happen. While, in the case of unstretched film or a flexible sheet such as paper, the content may be up to 30 wt.% and 36 g/m$^2$.

The light-shielding material includes every material capable of shielding visible and ultraviolet light.

Examples of the light-shielding material are various carbon blacks, iron oxide, zinc white, a titanium oxide, clay, aluminum powder, aluminum paste, calcium carbonate, mica, barium sulfate, talc, cadmium pigments, chrome yellow, red iron oxide, cobalt blue, copper-phthalocyanine pigments, monoazo and polyazo pigments, aniline black and various metal fibers. Various carbon blacks, aluminum powder and aluminum paste from which volatile components are removed are preferred.

The form of the light-shielding material prior to blending may be powder, paste, wet state, masterbatch, pellets, etc.

As the method of blending a light-shielding material, the masterbatch method is preferred in point of cost and easy processing. Various masterbatch methods are known, and any known method may be employed. Such a masterbatch method includes the method of dispersing carbon black into a polymer organic solvent solution to produce a masterbatch (Japanese Patent Publication No. 40-26196) and the method of dispersing carbon black into polyethylene to produce a masterbatch (Japanese Patent Publication NO. 43-10362).

The packaging material of the invention may be a composite film by laminating a flexible sheet layer on the polyethylene polymer layer. As such a flexible sheet layer, various thermoplastic resin films such as various polyethylene films, ethylene copolymer films, polypropylene films, polyvinyl chloride films, polyvinylidene chloride films, polyamide films, polycarbonate films, fluorocarbon polymer films, polyester films and their modified resin films. Various flexible sheets such as a metallized film such as aluminum-metallized film, cellulose acetate film, cellophane, polyvinyl alcohol film, paper, non-woven fabric, cross laminated airly fabric, a porous film, foamed polyethylene sheet, foamed polystyrene sheet and foamed polyurethane sheet are also suitable.

When the packaging film is a composite film, the polyethylene polymer layer is preferably located as the inner face layer to touch a photosensitive article or material. The polyethylene polymer layer may constitute a part of an inflation film where two or more layers are coextruded. The flexible sheet layer may be single, or two or more flexible sheet layers may be combined.

Among the flexible sheets, the metallized film is particularly suitable for the material packaging photosensitive materials.

Metallization is carried out according to a known method, such as vacuum evaporation, sputtering, ion plating, or electron beam heating. The metallic membrane layer may be formed on one face or both faces of the flexible sheet layer.

The metallic membrane layer may be formed of a pure metal such as Al, Sn, Zn, Co, Cr, Ni, Fe, Cu, etc., alloys thereof, or any other metals of which metallic membrane layer can be made, but aluminum is the most preferred in terms of processing and cost.

The thickness of metallic membrane layer to be metallized is 55-1200 Å. If it is thinner than 55 Å, antistatic properties of the film are insufficient. Moreover, in order to secure moistureproof and light-shielding, thickness of other layers such as the polyethylene polymer layer, a heat-resistant sheet layer and a heat sealing layer (the heat sealing layer endowed with light-shielding is preferable.) must be increased. On the other hand, when the thickness is thicker than 1200 Å, degradation of the thermoplastic resin film occurs by the heat of metallizing, and strength of the laminated film to be produced falls. In the case of aluminum-metallized membrane, the preferred thickness is thicker than 70 Å, more preferably 80 to 800 Å, and more preferably, 100 to 600 Å.

A protection layer may be provided on the metallic membrane, if necessary. As the protection layer, an acrylic resin, a cellulose resin such as cellulose acetate, polyurethane, epoxy resin, polyester, an ionomer resin, EEA resin, various polyethylenes or polypropylenes is employed, In addition, a wax, gelatin or polyvinyl alcohol can also be employed. The protection layer is extremely thin and is usually less than 50 $\mu$m and preferably, less than 5 $\mu$m in order to eliminate static electricity effectively, Such a protective layer may be formed by a known solution coating or spray coating. A conductive material such as an antistatic agent, carbon black, a metal powder such as aluminum powder or aluminum paste or carbon fiber may be added to a flexible sheet, a light-shielding layer, an adhesive layer or the protection layer, and thereby elimination of static electricity is insured.

Flexible sheet layers may be laminated according to a known method such as a heat sealing (hot bar sealing, impulse heat sealing, supersonic welding, etc.), the method using an adhesive (wet laminating, dry laminating, hot melt laminating, extrusion laminating, etc.) and co-extrusion method.

The adhesive is selected by considering both layers to be joined, and includes thermoplastic resin melting adhesives including a polyolefin adhesives, hot melting type gum adhesives and solution type adhesives. The polyolefin adhesives include a homopolymer and a copolymer of an olefin such as various polyethylenes, polypropylenes, polybutenes and ethylene-propylene copolymers and L-LDPE, a copolymer of an olefin and another monomer such as ethylene-vinyl acetate copolymer, ethylene-acrylate ester copolymer, various isomers ("SURLYN" Dupont, "Himiran" Mitsui Polychemicals Co., Ltd., etc.) and a graft copolymer. The solution type adhesives are divided into adhesives for wet lamination and adhesives for dry lamination. The adhesives for wet lamination are emulsion or latex. Examples of the emulsion-type adhesives are polyvinyl acetate emulsion, the emulsion of vinyl acetate-ethylene copolymer, the emulsion of vinyl acetate-acrylate ester copolymer, the emulsion of vinyl acetate-maleate ester copolymer, the emulsion of acrylic copolymer and the emulsion of ethylene-acrylic acid copolymer. Examples of the latex-type adhesives are natural rubber latex, styrene-butadiene rubber latex, acrylonitrile-butadiene rubber latex and chloroprene rubber latex. An example of the adhesives for dry lamination is polyurethane adhesive. Adhesives for hot melt lamination where paraffin wax, microcrystalline wax, ethylene-vinyl acetate copolymer, ethylene-ethylacrylate copolymer and etc. are blended, pressure-sensitive adhesives and temperature-sensitive adhesives may also be employed. Melting point of the adhesive employed is preferably more than 5° C. below from the melting point of the flexible sheet in order to laminate without bad influence upon the flexible sheet by a thermal melting adhesion.

Thickness of the adhesive layer formed by extrusion laminating using a thermoplastic resin is usually 10 to 500 $\mu$m, preferably 15 to 200 $\mu$m. However, the thickness is determined based upon cost, rate of application, thickness of the whole layers, and etc., and accordingly, the thickness is not limited to the above range.

Various additives may be added to one or more of the above layers. Examples of the additives are described below.

(1) Plasticizer; phthalic acid esters, glycol esters, fatty acid esters, phosphosic acid esters, etc.

(2) Stabilizer; lead compounds, cadmium compounds, zinc compounds, alkaline earth metal compounds, organic tin compounds, etc.

(3) Antistatic agent; cartion surfactants, anion surfactants, nonion surfactants, ampholytic surfactants, etc.

(4) Flame retardant; phosphoric acid esters, phosphoric acid ester halides, halides, inorganic materials, polyols containing phosphor, etc.

(5) Filler; alumina, kaolin, clay, calcium carbonate, mica, talc, titanium oxide, silica, etc.

(6) Reinforcing agent; glass roving, metallic fiber, glass fiber, glass milled fiber, carbon fiber, etc.

(7) Coloring agent; inorganic pigments (A1, $Fe_2O_3$, $TiO_2$, ZnO, CdS etc.), organic pigments (carbon black, etc.), dyes, etc.

(8) Blowing agent; inorganic blowing agents (ammonium carbonate, sodium hydrogen carbonate), organic blowing agents (nitroso compounds, azo compounds) etc.

(9) Vulcanizing agent, vulcanization accelerator, acceleration assistant, etc.

(10) Deterioration preventing agent, ultraviolet absorber, antioxidant, metal deactivator, peroxide decomposing agent, etc.

(11) Lubricant; paraffin wax, fatty acids, fatty acid amides, esters, higher alcohols, etc.

(12) Coupling agent; silane compounds, titanium compounds, chromium compounds, aluminum compounds etc.

(13) Various thermoplastic resins, rubbers

The packaging material of the invention is suitable for packaging silver halide photographic materials for photographic purpose, diazo photographic materials, photosensitive resins, self-developing type photographic materials, diffusion-transfer type photographic materials and other photographic materials which is degraded by moisture or a gas.

Package form may be usual, and includes a single-sheet flat bag, a double-sheet flat bag, a square bottom bag, a self-standing bag, a single-sheet gusset bag, a double-sheet gusset bag, a film sheet, inner lining for a moisture proof box and a leader paper. The sealing form may also be usual, and includes heat sealing, impulse heat sealing, supersonic welding and high frequency sealing. The methods of using an adhesive and a pressure sensitive adhesive may also be utilized.

The packaging material of the invention is superior in the small difference in tear strength between longitudinal direction and lateral direction, in physical strengthe, in heat sealing properties and in light-shielding property. As a result, its thickness can be appreciably thinner than the conventional packaging material, and its cost is lowered. By blending a fatty acid amide lubricant, packaging aptitude is further improved, and the blocking troubles between films and between a film and a photosensitive material to be packaged do not occur.

EXAMPLES

The packaging material of Example 1 corresponds to the embodiment illustrated in FIG. 1. This is a single layer film of L-LDPE of which $\alpha$-olefin is octene-1 ("STAMILEX #08-$\Omega$(#2H-218)", DSM) containing 3 wt.% of oil furnace carbon black and it was formed by inflation process. The blow-up ratio is 1.95, and the thickness of the film is 50 $\mu$m.

The packaging material of Example 2 has the same constitution as Example 1 except that L-LDPE is "STAMILEX #1046" (DSM) of which α-olefin is also octene-1.

The packaging material of Example 3 has the same constitution as Example 1 except that its composition is 89 wt.% of L-LDPE, 8 wt.% of LDPE and 3 wt.% of the same carbon black.

The packaging material of Example 4 has the same constitution as Example 3 except that L-LDPE resin is "STAMILEX #1046" (DSM).

The packaging material of Example 5 corresponds to the embodiment of FIG. 6. The L-LDPE film layer consists of 90 wt.% of "STAMILEX #08-106 (#2H-218)" (DSM) and 10 wt.% of LDPE, and it was formed by inflation process. The blow-up ratio is 1.95, and the thickness is 50 μm. The adhesive layer is 13 μm of LDPE, and the flexible sheet layer is 35 g/m² of bleached kraft paper containing 5 wt.% of carbon black.

The packaging material of Example 6 has the same constitution as Example 5 except that "STAMILEX #08-106 (#2H-218)" is replaced by "STAMILEX #1046".

The packaging material of Example 7 corresponds to the embodiment of FIG. 2. The light-shielding L-LDPE layer is the same as Example 4, and the adhesive layer is 15 μm of LDPE. The flexible sheet layer is 73 g/m² of Clupak paper.

The packaging material of Example 8 corresponds to the embodiment of FIG. 3. The light-shielding L-LDPE layer is the same as Example 4, and the adhesive layer between the light-shielding L-LDPE layer and the metal foil is 13 μm of LDPE. The metal foil is 7 μm of aluminum foil, and the adhesive layer thereupon is 15 μm of LDPE. The flexible sheet layer is 30 g/m² of bleached kraft paper.

The packaging material of Example 9 corresponds to the embodiment of FIG. 4. The light-shielding L-LDPE layer is the same as Example 4, and the adhesive layer is LDPE. The metallized flexible sheet layer consists of 15 μm of biaxially stretched nylon film and 400 Å of vacuum metallized aluminum membrane.

The packaging material of Example 10 corresponds to the embodiment of FIG. 5. The light-shielding L-LDPE film layer is the same as Example 4 except that its thickness is 30 μm, and the thermoplastic resin layer is 30 μm of high-density polyethylene film "Hizex" (Mitsui Petrochemical Industries Co., Ltd.) containing 3 wt.% of carbon black.

The packaging material of Example 11 corresponds to the embodiment of FIG. 8. The L-LDPE film layer is the same as that of Example 6, and the adhesive layer is 15 μm of LDPE containing 3 wt.% of carbon black. The metallized flexible sheet layer consists of 25 μm of biaxially stretched polypropylene film and 400 Å of vacuum metallized aluminum membrane. 50 g/m² of bleached kraft paper is further laminated thereupon through 15 μm of LDPE adhesive layer.

The packaging material of Example 12 corresponds to the embodiment of FIG. 10. The light-shielding L-LDPE film layer is the same as Example 4. The middle flexible sheet layer is 500 μm of foamed polystyrene sheet (Nippon Polystyrene Paper K.K.), and the upper flexible sheet layer is 12 μm of biaxially stretched polyester film. Both of the adhesive layers are 15 μm of LDPE.

Comparative packaging material 1 corresponds to the construction of FIG. 1. This is a single layer film of L-LDPE of which α-olefin is butene-1 ("STAMILEX #1048, DSM) consisting of 89 wt.% of the above L-LDPE, 8 wt.% of LDPE and 3 wt.% of carbon black, and it was formed by inflation process. The blow-up ratio is 1.95, and the thickness of the film is 50 μm.

Comparative packaging material 2 corresponds to the construction of FIG. 1, and it is the same as Example 4 except that "STAMILEX #1016 (190 2H 235)" (DSM) of which α-olefin is octene-1 is employed instead of "STAMILEX #1046".

Comparative packaging material 3 is a single layer L-LDPE film of "STAMILEX #08-106 (#2H-218)" formed by inflation process. The blow-up ratio is 1.4, and the thickness of the film is 50 μm.

Comparative packaging material 4 is a single layer L-LDPE film of "STAMILEX #1046" formed by inflation process. The blow-up ratio is 1.4, and the thickness of the film is 30 μm.

Comparative packaging material 5 is a single layer L-LDPE film of "ULTZEX #2020L (Mitsui Petrochemical Industries Co., Ltd.) of which α-olefin is 4-methylpentene-1 ($C_6$) formed by inflation process. The blow-up ratio is 1.4, and the thickness of the film is 30 μm.

Comparative packaging material 6 corresponds to the construction of FIG. 3. The light-shielding L-LDPE layer consists of 89.5 wt.% of L-LDPE "ULTZEX #2020L" (Mitsui Petrochemical Industries Co., Ltd.), 7.5 wt.% of LDPE and 3 wt.% of carbon black, and it was formed by inflation process. The blow-up ratio is 1.7, and the thickness of the layer is 50 μm. The two adhesive layers is 15 μm of LDPE, and the metal foil is 7 μm of aluminum foil. The flexible sheet layer is 30 g/m² of bleached kraft paper.

Conventional packaging material 1 corresponds to FIG. 21. This material is the light-shielding LDPE film layer consisting of 97 wt.% of LDPE and 3 wt.% of carbon black, and it was formed by inflation process. The blow-up ratio is 1.7, and the thickness of the film is 70 μm.

Conventional packaging material 2 corresponds to FIG. 22. Its constitution is the same as Example 8 except that 70 μm of the above light-shielding LDPE film layer is employed instead of 50 μm of the light-shielding L-LDPE film layer.

Constitutions of the above packaging materials are tablated in Table 1, and their properties are tablated in Table 2.

In the packaging materials, the following materials are employed;

LDPE layer 7.7a: "DFD-0111" (Nippon Unicar Co., Ltd.)
MI: 2.4 g/10 minutes, Density: 0.923 g/cm LDPE adhesive layer 2.2a: "MIRASON 14" (Mitsui Polychemicals Co., Ltd.)
MI: 5.1 g/10 minutes, Density: 0.919 g/cm Carbon black: "#44B Oil furnace carbon black" (Mitsubishi Chemical Industries Ltd.)
Mean particle size: 21 mμ, pH: 7.7

TABLE 1

| Ex. No. | L-LDPE Density | L-LDPE MI | L-LDPE α-olefin | L-LDPE wt. % | CB*1 (wt. %) | LDPE (wt. %) | Blow-up Ratio | Thickness (μm) | FIG. No. |
|---|---|---|---|---|---|---|---|---|---|
| Invention | | | | | | | | | |
| 1 | 0.925 | 2 | $C_8$ | 97 | 3 | 0 | 1.95 | 50 | FIG. 1 |
| 2 | " | 4 | " | " | " | " | " | " | " |
| 3 | " | 2 | " | 89 | " | 8 | " | " | " |
| 4 | " | 4 | " | " | " | " | " | " | " |
| 5 | " | 2 | " | 90 | 0 | 10 | " | " | " |
| 6 | " | 4 | " | " | " | " | " | " | " |
| 7 | " | " | " | 89 | 3 | 8 | " | " | FIG. 2 |
| 8 | " | " | " | " | " | " | " | " | FIG. 3 |
| 9 | " | " | " | " | " | " | " | " | FIG. 4 |
| 10 | " | " | " | " | " | HDPE 97 | " | 30 / 30 | FIG. 5 |
| 11 | 0.925 | 4 | $C_8$ | 90 | 0 | 10 | " | 50 | FIG. 8 |
| 12 | " | " | " | 89 | 3 | 8 | " | " | FIG. 10 |
| Comparative | | | | | | | | | |
| 1 | " | " | $C_4$ | " | " | " | " | " | FIG. 1 |
| 2 | " | 1 | $C_8$ | " | " | " | " | " | " |
| 3 | " | 2 | " | 100 | 0 | 0 | 1.4 | 30 | " |
| 4 | " | 4 | " | " | " | " | " | " | " |
| 5 | 0.922 | 2.5 | $C_6$ | " | " | " | " | " | " |
| 6 | " | " | " | 89 | 3 | 8 | 1.7 | 50 | FIG. 3 |
| Conventional | | | | | | | | | |
| 1*1 | 0.923 | 2.4 | — | — | 3 | 97 | " | 70 | FIG. 21 |
| 2*2 | " | " | — | — | " | " | " | " | FIG. 22 |

*1 Carbon Black
*2 LDPE

TABLE 2

| Ex. No. | Tear Strength Longitudinal direction (g) | Tear Strength Lateral direction (g) | Impact perforation Strength Right side (Kg·cm) | Impact perforation Strength Reverse side (Kg·cm) | L.S.*1 | H.T.*2 | G.S.*3 | S.C.*4 | B.A.*5 |
|---|---|---|---|---|---|---|---|---|---|
| Invention | | | | | | | | | |
| 1 | 923 | 1146 | 6.8 | 6.2 | A | B | A | B | A |
| 2 | 1164 | 1124 | 8.9 | 9.2 | " | " | " | " | " |
| 3 | 1103 | 1348 | 7.6 | 6.8 | " | " | " | " | C |
| 4 | 1252 | 1199 | 9.7 | 10.2 | " | " | " | " | " |
| 5 | 836 | 956 | 5.6 | 5.3 | B | " | " | " | A |
| 6 | 1082 | 1008 | 7.2 | 8.4 | " | " | " | " | " |
| 7 | 1600< | 1600< | 10.3 | 11.6 | A | " | " | " | " |
| 8 | 926 | 983 | 8.8 | 9.3 | " | " | B | " | " |
| 9 | 1600< | 1600< | 11.2 | 12.6 | " | " | " | " | " |
| 10 | 1121 | 1086 | 7.2 | 6.4 | " | " | " | " | " |
| 11 | 1600< | 1600< | 12.6 | 13.8 | " | " | " | " | " |
| 12 | " | " | 14.8 | 14.3 | A | " | A | " | B |
| Comparative | | | | | | | | | |
| 1 | 116 | 462 | 6.9 | 7.4 | " | " | C | " | C |
| 2 | 463 | 1574 | 11.2 | 12.4 | " | " | B | " | B |
| 3 | 336 | 922 | 4.1 | 3.8 | E | " | " | " | " |
| 4 | 291 | 883 | 4.5 | 5.6 | " | " | " | " | " |
| 5 | 315 | 685 | 6.3 | 6.7 | " | " | " | " | " |
| 6 | 317 | 326 | 8.5 | 10.5 | A | " | " | " | A |
| Conventional | | | | | | | | | |
| 1 | 152 | 456 | 7.3 | 6.3 | " | E | C | E | C |
| 2 | 212 | 157 | 5.2 | 5.8 | " | " | " | " | " |

*1 Light-Shielding Ability
*2 Hot-Tack Property
*3 Gelbo Test Strength
*4 Seal Ability of Contraries
*5 Bag-Making Aptitude Evaluations in Table 2 are carried out as follows;

| A | very excellent | B | excellent |
|---|---|---|---|
| C | practical | D | having a problem |
| E | impractical | | |

Testing methods were as follows;
Density; JIS K 6760 (=ASTM D-1505)
Melt Index; JIS D 6760 (=ASTM 1238)
Thickness; JIS P 8118
Tear Strength; JIS P 8116
Impact Puncture Strength; JIS P 8134
Gelbo Test Strength; Estimated by the number of bendings until the sample lost its light-shielding property due to the occurrence of pin holes. The testing machine according to U.S. Military Standard MIL-B 131 was employed. The larger number expresses the larger strength.
A 101 times or more
B 51-100 times
C 7-50 times
D 3-7 times
E 2 times or less Light-Shielding Character; A photographic film of ASA 100 was put into the bag made by each exemplified film, and then the bag was completely sealed. This bag was exposed to the light of 80,000 luxes for one hour, and the light-shielding character was estimated by the fogging degree of the photographic film.

Hot Tack Properties (Hot-Seal Ability); Two sheets of each exemplified film having 15 mm in width was sealed by heat sealing, and just after, the open ends were pulled by the weight of 45 g at the releasing angle of 22.5 degrees. This character was estimated by the released length (cm).

Moistureproofness; JIS Z 0208-1976

The examples containing a lubricant are shown in Examples 13-15.

The packaging material of Example 13 corresponds to the embodiment illustrated in FIG. 11. This is a single layer film of L-LDPE of which α-olefin is octene-1 ("STAMILEX #08-106 (2H-218)", DSM) containing 8 wt.% of LDPE, 3 wt.% of carbon black and 0.1 wt.% of oleic acid amide lubricant, and formed by inflation process. The blow-up ratio is 1.2, and the thickness of the film is 50 μm.

The packaging material of Example 14 has the same constitution as Example 13 except that L-LDPE is "STAMILEX #1046".

The packaging material of Example 15 corresponds to the embodiment of FIG. 14. The light-shielding L-LDPE film layer containing a lubricant is the same as Example 14, and the metallized flexible sheet layer consists of 25 μm of unstretched polypropylene film and 400 Å of vacuum metallized aluminum membrane. The adhesive layer between them is 13 μm of LDPE. 50 g/m² is bleached kraft paper is further laminated thereupon through 13 μm of LDPE adhesive layer.

Comparative packaging material 7 is the same as Example 13 except that L-LDPE resin is "ULTZEX #2021L" (Mitsui Petrochemical Industries Co., Ltd.) of which α-olefin is 4-methylpentene-1.

Comparative packaging material 8 is the same as Example 13 except that L-LDPE resin is "ULTZEX #3010F" (Mitsui Petrochemical Industries Co., Ltd.)

Comparative packaging material 9 is the same as Example 13 except that L-LDPE resin is "ULTZEX #3520L" (Mitsui Petrochemical Industries Co., Ltd.).

Comparative packaging material 10 is the same as Example 13 except that L-LDPE resin is "STAMILEX #1258" (DSM) of which α-olefin is butene-1.

Comparative packaging material 11 is the same as Example 13 except that L-LDPE resin is "STAMILEX #1016 (#2H-235)" (DSM).

Comparative packaging material 12 is the same as Example 15 except that the film of comparative packaging material 7 is employed as the light-shielding L-LDPE film layer containing a lubricant.

The packaging material of Example 3 (Comparative Example 13) corresponds to the comparative example of Example 13, because they are the same as each other except that no lubricant is added to the former packaging material. Example 4 (Comparative Example 14) corresponds to the comparative example of Example 14 because of the same reason as above.

Conventional packaging material 3 is the same as Comparative Example 7 except that no carbon black nor lubricant is added.

Conventional packaging material 4 is the same as Example 13 except that no carbon black nor lubricant is added.

Conventional packaging material 5 is the same as Example 15 except that no carbon black nor lubricant is added.

Constitutions of these packaging materials are tablated in Table 3, and their properties are tablated in Table 4.

LDPE layer, LDPE adhesive layer and carbon black are the same as those described in the cases of Tables 1 and 2.

TABLE 3

| | L-LDPE | | | | CB (wt. %) | LDPE (wt. %) | Lubricant*2 (wt. %) | Thickness (μm) | FIG. No. |
|---|---|---|---|---|---|---|---|---|---|
| Ex. No. | Density | MI | α-olefin | wt. % | | | | | |
| Invention | | | | | | | | | |
| 13 | 0.925 | 2 | C8 | 88.9 | 3 | 8 | 0.1 | 50 | FIG. 11 |
| 14 | " | 4 | C8 | " | " | " | " | " | " |
| 15 | " | " | " | " | " | " | " | " | FIG. 14 |
| Comparative | | | | | | | | | |
| 7 | 0.920 | 2.1 | C6 | " | " | " | " | " | FIG. 11 |
| 8 | 0.930 | 1.3 | " | " | " | " | " | " | " |
| 9 | 0.935 | 2.1 | " | " | " | " | " | " | " |
| 10 | 0.925 | 2.5 | C4 | " | " | " | " | " | " |
| 11 | " | 1 | C8 | " | " | " | " | " | " |
| 12 | 0.920 | 2.1 | C6 | " | " | " | " | " | FIG. 14 |
| 13 (Ex. 3) | 0.925 | 2 | C8 | 89 | " | " | 0 | " | FIG. 11 |
| 14 (Ex. 4) | " | 4 | " | " | " | " | " | " | " |
| Conventional | | | | | | | | | |
| 3 | 0.920 | 2.1 | C6 | 92 | 0 | " | " | " | " |
| 4 | | | C8 | " | " | " | " | " | " |
| 5 | 0.925 | 4 | " | " | " | " | " | " | " |
| 1*1 | 0.923 | 2.4 | — | — | 3 | 97 | " | 70 | FIG. 21 |

*1LDPE
*2Oleic Acid Amide

TABLE 4-1

| Ex. No. | Angle of Slip Longitudinal Ri—Ri[*1] | Angle of Slip Longitudinal Re—Re[*2] | Angle of Slip Lateral Ri—Ri | Angle of Slip Lateral Re—Re | Slipping[*4] character | P.A.[*3] |
| --- | --- | --- | --- | --- | --- | --- |
| Invention | | | | | | |
| 13 | 15 | 13 | 13 | 12 | A | A |
| 14 | 13 | 17 | 12 | 14 | " | " |
| 15 | " | 15 | " | 12 | " | " |
| Comparative | | | | | | |
| 7 | 11 | 13 | " | 14 | " | " |
| 8 | " | 11 | 13 | 12 | " | " |
| 9 | 10 | 9 | 8 | " | " | " |
| 10 | 13 | 16 | 12 | " | " | " |
| 11 | 12 | 13 | " | 13 | " | " |
| 12 | 11 | 11 | " | " | " | " |
| 13 (Ex. 3) | 42 | 40 | 40 | 41 | E | D |
| 14 (Ex. 4) | 38 | 42 | 37 | 40 | " | " |
| Conventional | | | | | | |
| 3 | 33 | 35 | 34 | 36 | D | " |
| 4 | 45 | 43 | 44 | 45 | E | " |
| 5 | 42 | 45 | 40 | 43 | " | " |
| 1[*1] | 22 | 24 | 23 | 25 | C | C |

[*1] Right Side-Right Side
[*2] Reverse Side-Reverse Side
[*3] Packaging Aptitude
[*4] Slip between L-LDPE film and packaged material

TABLE 4-2

| Ex. No. | Tear Strength Longitudinal direction (g) | Tear Strength Lateral direction (g) | Impact perforation Strength Right side (Kg·cm) | Impact perforation Strength Reverse side (Kg·cm) | L.S. | H.T. | G.S. | S.C. | B.A. | Blocking of L-LDPE Film |
| --- | --- | --- | --- | --- | --- | --- | --- | --- | --- | --- |
| Invention | | | | | | | | | | |
| 13 | 1211 | 1514 | 8.1 | 7.3 | A | B | A | B | A | A |
| 14 | 1356 | 1218 | 10.3 | 10.9 | " | " | " | " | " | " |
| 15 | 1600< | 1600< | 13.8 | 14.8 | " | " | B | " | " | " |
| Comparative | | | | | | | | | | |
| 7 | 938 | 1146 | 9.2 | 9.4 | " | " | A | " | " | " |
| 8 | 312 | 752 | 8.6 | 8.9 | " | " | " | " | " | " |
| 9 | 266 | 496 | 9.8 | 9.1 | " | " | " | " | " | " |
| 10 | 834 | 813 | 5.1 | 6.1 | " | " | B | " | " | " |
| 11 | 517 | 1563 | 12.8 | 12.9 | " | " | A | " | " | " |
| 12 | 1600< | 1600< | 12.7 | 13.5 | " | " | B | " | " | " |
| 13 (Ex. 3) | 1103 | 1348 | 7.6 | 6.8 | " | " | A | " | C | C |
| 14 (Ex. 4) | 1252 | 1199 | 9.7 | 10.2 | " | " | " | " | " | " |
| Conventional | | | | | | | | | | |
| 3 | 593 | 796 | 7.8 | 8.1 | E | " | B | " | D | D |
| 4 | 982 | 1120 | 7.1 | 6.3 | " | " | " | " | " | " |
| 5 | 1118 | 1090 | 8.9 | 9.3 | " | " | " | " | " | " |
| 1 | 152 | 456 | 7.3 | 6.3 | B | E | C | E | C | B |

Evaluations in Table 4 are carried out in the same manner as Table 2.

Angle of Slip; A part of the sample was cut off, and stuck on the underside of 75 mm length×35 mm width of a block weighing 200 g. Another part of the sample was stuck on an inclined face, and the above block was placed on the face. The inclined angle was increased, and the angle where the block began to slip was read.

I claim:

1. A packaging material for photosensitive materials for photographic purpose being light-shielding and having the following polyethylene polymer layer;
    (a) containing 40 to 99% by weight of a low-pressure linear low-density polyethylene (L-LDPE) produced by copolymerization of ethylene and heptene-1 or octene-1 by a liquid phase method, the density of said polyethylene is in the range from 0.870 to 0.925 g/cm$^3$, and the melt index of said polyethylene is in the range from 1.2 to 10 g/10 minutes,
    (b) having a thickness of thicker than 20 μm,
    (c) being formed by inflation process, and
    (d) having a tear strength in longitudinal direction / a tear strength in lateral direction ratio of more than 0.6.

2. The packaging material of claim 1, wherein said polyethylene polymer layer contains 0.1 to 15% by weight of carbon black.

3. The packaging material of claim 2, wherein said polyethylene polymer layer further contains 0.03 to 1% by weight of a fatty acid amide lubricant and said polyethylene polymer layer is located as the inner face layer to touch a photosensitive article or material to be packaged.

4. The packaging material of claim 1, wherein said polyethylene polymer layer further contains a high-pressure low-density polyethylene (LDPE).

* * * * *